Patented Mar. 17, 1925.

1,530,358

UNITED STATES PATENT OFFICE.

ARMAND DE WAELE, OF LONDON, ENGLAND, ASSIGNOR TO D. GESTETNER, LIMITED, OF LONDON, ENGLAND.

PRODUCTION OF STENCILS FOR USE IN DUPLICATING MANUSCRIPT AND TYPE-WRITTEN DOCUMENTS, DRAWINGS, AND THE LIKE.

No Drawing.   Application filed November 21, 1923. Serial No. 676,179.

*To all whom it may concern:*

Be it known that I, ARMAND DE WAELE, a subject of the King of Great Britain and Ireland, and residing at 29 Belmont Avenue, Palmers Green, London, N. 13, England, have invented certain new and useful Improvments in and Relating to the Production of Stencils for Use in Duplicating Manuscript and Typewritten Documents, Drawings, and the like, of which the following is a specification.

This invention relates to the production of stencils for use in duplicating manuscript and typewritten documents, drawings and the like and particularly of the type in which a porous support such as Yoshino paper is provided with a stencil layer including a gelatinized organic colloid, for instance a coagulated protein, which does not need moistening in order to soften the coating composition prior to cutting the stencil.

Certain difficulties arise in the production of stencils of this kind, the main difficulty being due to the fact that comparatively few tempering agents, the presence of which in the stencil layer is, generally speaking, if not invariably, necessary, have hitherto been able to be brought into sufficiently intimate association with the colloid.

There is, moreover, a further difficulty which is encountered when using as tempering agents a number of materials of a non-hygroscopic character, for instance oils or oleaginous materials, liquid at the normal temperature of the air, namely, the tendency of the tempering agent to sweat out.

The present invention is based upon the observation that inorganic bodies capable of dispersion through the medium in which the organic colloid is dispersed operate to prevent sweating and may also in other respects improve the character of the stencil.

Thus, inorganic bodies capable of forming colloid sols or colloidal solutions in the disperse medium may be employed in accordance with the invention. The inorganic bodies most suitable for use would appear to be such as absorb many times their own weight of a disperse medium, which may be the medium in which the organic colloid is dispersed, forming gels and in some cases the employment of such of these materials as possess a negative charge would appear desirable.

As examples of inorganic bodies which may be employed, highly colloidal clays may be mentioned and particularly those clays which swell considerably and gelate in aqueous media.

The material known as "Bentonite," deposits of which occur in the State of Wyoming, United States of America, and in Alberta, Canada, is a specific example.

This material, dried at 110° C., has the following chemical composition:—

|  | Per cent. |
|---|---|
| Silica ($SiO_2$) | 57.98 |
| Ferrous oxide (FeO) | 0.12 |
| Ferric oxide ($Fe_2O_3$) | 3.80 |
| Alumina ($Al_2O_3$) | 22.46 |
| Lime (CaO) | 1.92 |
| Magnesia (MgO) | 3.24 |
| Soda and potash ($Na_2O$ and $K_2O$) | 1.35 |
| Sulphur trioxide ($SO_3$) | 0.75 |
| Loss on ignition ($H_2O$, $CO_2$, Org.) | 7.93 |

The state of division of the material is indicated by the fact that 73.82% of the product as marketed is represented by particles less than 0.0015 mm. in diameter.

The addition of such materials may also assist in securing or maintaining the tempering agent in the desired degree of dispersion, but it would appear that their main function is to prevent the tempering agent sweating out of the coating composition.

It is to be remarked that where the inorganic bodies in question possess the capacity of swelling or gelating, steps must be taken to ensure that they will become so swollen or gelated.

For instance, it may be found that if they are not swollen or gelated before they are added to the organic colloid disperse, they will not swell or gelate subsequently. Consequently, it may be stated that it is generally desirable or necessary to subject such bodies before admixing them with the organic colloid disperse to treatment to ensure their gelation as for instance by adding the bodies in question to a convenient quantity of warm or cold water, allowing the mixture to stand for a suitable period of time until the swelling or gelation is complete and then agitating the mass to obtain a uniform product.

As an example of a suitable composition, the following may be given:—

150 parts by weight of a 10% solution of gelatine; 100 parts by weight of mineral oil of s. g. 0.85–0.9.

To the mixture 5 parts of Bentonite previously allowed to swell or gelatinize in at least 50 parts by weight of water may be added.

As a further example:—

200 parts by weight of a 10% solution of gelatine; 100 parts by weight of mineral oil of s. g. 0.85–0.9.

To this three parts of Bentonite and 7 parts of levigated (or so-called colloidal) china clay of commerce may be added.

Yoshino paper is coated with the composition in the usual manner and after drying the coated sheet may be treated with formaldehyde vapour.

When, however, seaweed jellies, such as agar-agar, carragheen moss, Irish moss, Iceland moss, Japanese isinglass or the like gelatinizing organic colloids are employed, treatment with formaldehyde vapour may be omitted.

Claims:—

1. A stencil sheet for use in duplicating manuscript and typewritten documents drawings or the like, comprising a stencil layer including a gelatinized organic colloid, a tempering agent and an inorganic body capable of dispersion in a medium employed as the extensive dispersion means for the organic colloid, said inorganic body possessing the property of preventing the tempering agent sweating.

2. A stencil sheet for use in duplicating manuscript and typewritten documents, drawings or the like, comprising a stencil layer including a gelatinized organic colloid, a non-hygroscopic body acting as tempering agent and an inorganic body capable of extensive dispersion in a medium employed as the dispersion means for the organic colloid, said inorganic body possessing the property of preventing the non-hygroscopic body sweating.

3. A stencil sheet for use in duplicating manuscript and typewritten documents, drawings or the like, comprising a stencil layer including a gelatinized organic colloid, an oily body acting as tempering agent and an inorganic body capable of extensive dispersion in a medium employed as the dispersion means for the organic colloid, said inorganic body possessing the property of preventing the oily body sweating.

4. A stencil sheet for use in duplicating manuscript and typewritten documents, drawings or the like, comprising a stencil layer including a gelatinized organic colloid, a non-hygroscopic oily body acting as tempering agent and an inorganic body capable of gelating strongly in the disperse medium for the organic colloid, said inorganic body possessing the property of preventing the non-hygroscopic body sweating.

5. A stencil sheet for use in duplicating manuscript and typewritten documents, drawings or the like, comprising a stencil layer including a gelatinized organic colloid, an oily body acting as tempering agent and an inorganic body capable of gelating strongly in the disperse medium for the organic colloid, said inorganic body possessing the property of preventing the oily body sweating.

6. A stencil sheet for use in duplicating manuscript and typewritten documents, drawings or the like, comprising a stencil layer including a gelatinized organic colloid, a non-hygroscopic body acting as tempering agent and a highly colloidal clay.

7. A stencil sheet for use in duplicating manuscript and typewritten documents, drawings or the like, comprising a stencil layer including a gelatinized organic colloid, an oily body acting as tempering agent and a highly colloidal clay.

8. A stencil sheet for use in duplicating manuscript and typewritten documents, drawings or the like, comprising a stencil layer including a coagulated protein, an oily tempering agent and an inorganic body capable of gelating strongly in water adapted to prevent the oily tempering agent sweating.

9. A stencil sheet for use in duplicating manuscript and typewritten documents, drawings or the like, comprising a stencil layer including a coagulated protein, an oily tempering agent and a highly colloidal clay.

10. A stencil sheet for use in duplicating manuscript and typewritten documents, drawings or the like, comprising a stencil layer including a coagulated protein, an oily tempering agent and Bentonite.

In testimony whereof I have signed my name to this specification.

ARMAND DE WAELE.